Nov. 24, 1925.
A. C. LEICH ET AL
1,562,894
ICE CREAM SANDWICH MACHINE
Filed April 9, 1923
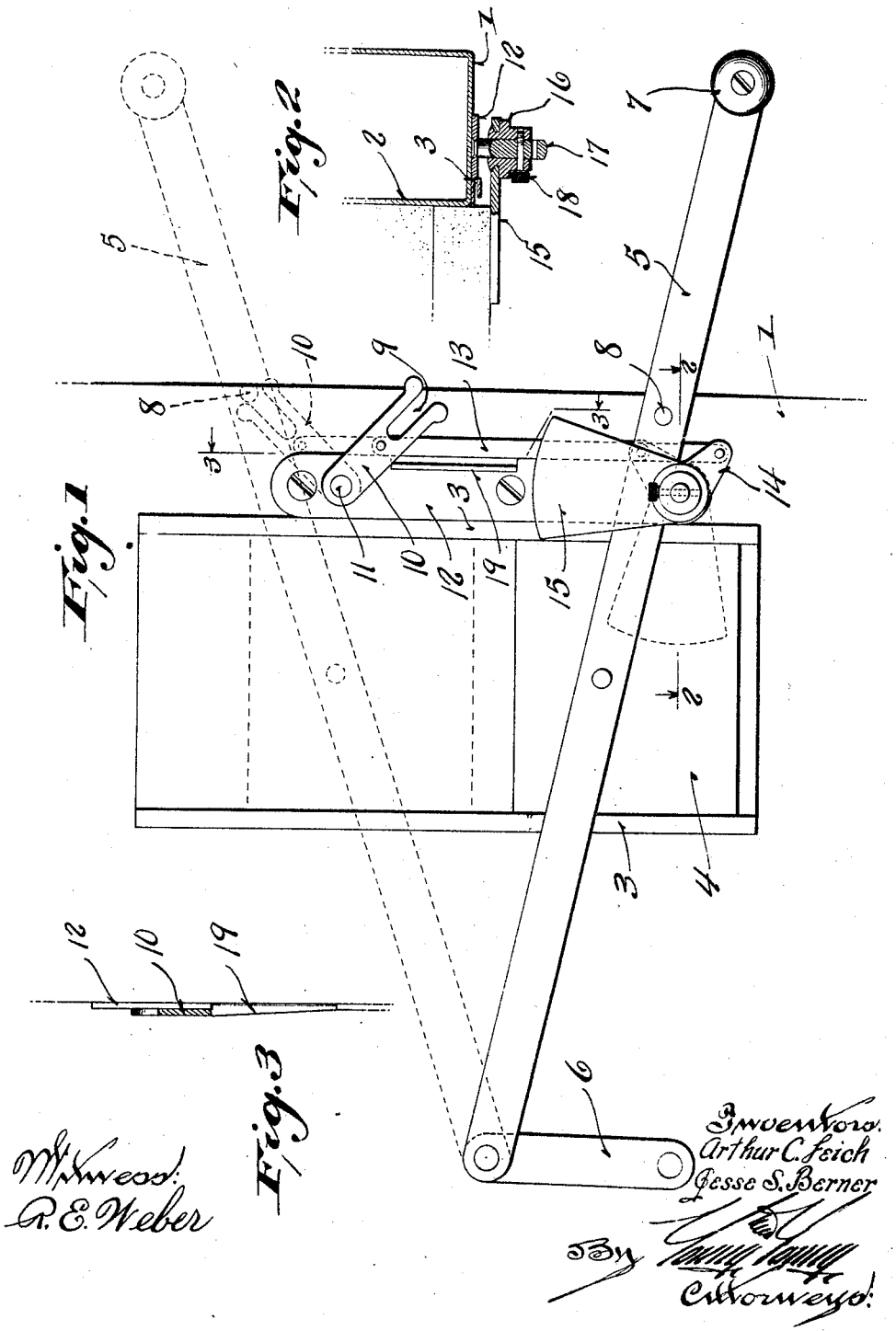

Patented Nov. 24, 1925.

1,562,894

UNITED STATES PATENT OFFICE.

ARTHUR C. LEICH AND JESSE S. BERNER, OF MILWAUKEE, WISCONSIN.

ICE-CREAM-SANDWICH MACHINE.

Application filed April 9, 1923. Serial No. 630,837.

*To all whom it may concern:*

Be it known that we, ARTHUR C. LEICH and JESSE S. BERNER, both citizens of the United States, and residents of Milwaukee, in the county of Milwaukee and State of Wisconsin, have invented certain new and useful Improvements in Ice-Cream-Sandwich Machines; and we do hereby declare that the following is a full, clear, and exact description thereof.

This invention relates to an ice cream sandwich machine and is an improvement over that disclosed in a patent issued to us jointly July 15, 1919, No. 1,309,643, for ice cream sandwich machine.

In general, this invention has the same objects as those disclosed in such application, but especially has for its object the provision of means for preventing ice cream from falling from the mouth of the ice cream casing.

It has been found that when the block of ice cream is nearly used up that the relatively thin slab of cream left in the container tends to topple over or fall out after the reciprocatory cutter is removed therefrom. As stated, this invention is designed to overcome this defect and to provide means which moves in front of the slab of cream and retains it in position when the reciprocatory cutter is elevated.

Further objects are to provide retaining means which may be adjusted to cooperate with the machine when it cuts different sized slices and to provide an extremely simple and readily cleaned device for accomplishing these functions.

An embodiment of the invention is shown in the drawings, in which—

Figure 1 is a fragmentary view of the front face of an ice cream sandwich machine with the improvements thereon, showing in full lines the position of the parts when the cutter is down, and in dotted lines their corresponding position when the cutter is elevated.

Figure 2 is a sectional view on the line 2—2 of Figure 1, showing the parts in the position they occupy when the cutter is elevated.

Figure 3 is a detailed sectional view on the line 3—3 of Figure 1.

Referring more particularly to the drawings, it will be seen that the usual ice receptacle 1 is provided and that an ice cream casing 2 (see Figure 2) extends into the ice receptacle. The major portions of the mechanism may be the same as that disclosed in the above noted patent. The ice cream casing 2 opens outwardly through the front face of the ice receptacle 1, as illustrated in Figures 1 and 2, and a pair of vertical guides 3 are provided adjacent the margins of the opening. Between these guides a reciprocatory cutter 4 is slidably mounted and is operated by an actuating lever 5 pivotally joined to such cutter at a point intermediate the ends of such lever. This lever may be pivotally carried by a link 6 attached to a stationary portion of the apparatus in the usual manner, and is provided with an operating handle 7. A pin 8 projects inwardly from the lever and is adapted to pass into the opening 9 of a forked lever 10 pivoted at 11 to a strip 12 attached to the face of the casing in any suitable manner, as, for instance, by means of screws. The lever 10 is connected by means of a pitman 13 with the relatively short lever 14 of a shutter 15 mounted at one side of the opening of the ice cream casing, as shown in Figures 1 and 2.

The shutter is loosely mounted upon a hub 16, carried by a pin 17 secured to the plate 12. It is slidable upon the pin and is adapted to occupy any one of several positions, as illustrated in Figure 2, being held in a desired position by means of a thumb screw 18, which is passed through cooperating apertures formed in the hub and pin and screwed into the hub. This adjustment is provided so that the shutter will cooperate with the machine when forming different sized slices.

When the lever 5 is moved upwardly from the full line position shown in Figure 1, it rides over a cam surface 19, which, as may be seen from Figure 3, is of the nature of a very thin wedge, such cam portion being formed by upturning a portion of the plate 12. This moves the lever 5 outwardly a slight distance and guides it over the small lever 10. Upon continued upward motion the pin 8 passes into the slot 9 and rocks the lever 10 into the dotted line position, thereby raising the pitman 13 and moving the shutter 15 into the dotted line position in front of the slab of cream remaining in the casing 2 after a slice has been removed. Upon downward motion of the lever 5, the pin 8 cooperating with the slot 9 rocks the lever 10 downwardly, thereby moving the shutter 15 out of the way and into the full line position shown in Figure 1.

It is to be noted that the pitman 13 is mounted upon the inner side of the levers 10 and 14 and consequently in the plane of the plate 12. This pitman, therefore, acts as a stop by contacting with the vertical outer edge of the plate 12 to hold the shutter 15 in the correct position when at the limits of its rocking motion.

It will thus be seen that an ice cream sandwich machine has been provided in which means are furnished for retaining a thin slab of ice cream in the ice cream casing, and preventing such slab of cream from toppling over or falling outwardly from the mouth of the casing.

It will also be seen that the device may be readily attached to existing ice cream sandwich machines by merely providing a plurality of screw holes for the attaching screws of the plate 12, and by providing a pin 8 for the actuating lever.

It will further be seen that the means for retaining the slab of ice cream in position may be most cheaply manufactured, may be readily applied, and may be easily kept in a sanitary condition.

We claim:

An attachment for an ice cream sandwich machine having an open mouthed casing, said attachment comprising side guides adapted to be positioned upon opposite sides of the mouth of the casing, a knife carried in said side guide, a lever provided with a link at one end adapted for attachment to said machine, and pivoted intermediate its ends to said knife and adapted to raise and lower said knife, a side plate, a shutter pivoted adjacent the lower end of said side plate and adapted to occupy either a vertical or a horizontal position, said shutter when in its horizontal position being located in front of said open mouth, and shutter-operating mechanism normally disconnected from said lever and adapted to be engaged by said lever when said lever is in the upper portion of its stroke, said side plate having a cam adapted to lift said lever over said mechanism.

In testimony that we claim the foregoing we have hereunto set our hands at Milwaukee, in the county of Milwaukee and State of Wisconsin.

ARTHUR C. LEICH.
JESSE S. BERNER.